United States Patent [19]
Goforth et al.

[11] Patent Number: 5,419,877
[45] Date of Patent: May 30, 1995

[54] ACOUSTIC BARRIER SEPARATOR

[75] Inventors: Robert R. Goforth, Encinitas; Tihiro Ohkawa, La Jolla, both of Calif.

[73] Assignee: General Atomics, San Diego, Calif.

[21] Appl. No.: 123,635

[22] Filed: Sep. 17, 1993

[51] Int. Cl.$^6$ .................. B01D 51/08; B01D 53/10; B01D 53/34; B06B 1/00

[52] U.S. Cl. ..................... 422/177; 55/277; 55/DIG. 25; 96/150; 23/313 R; 422/127; 422/168; 422/217

[58] Field of Search ............... 422/127, 128, 168, 177, 422/213, 172, 217; 55/277, DIG. 25; 96/150; 95/29, 107, 135, 137, 110; 423/210, 235, 244, 215.5; 23/313 R; 110/216

[56] References Cited

U.S. PATENT DOCUMENTS

| | | | |
|---|---|---|---|
| 1,120,682 | 12/1914 | Bucher | 422/213 X |
| 3,076,544 | 2/1963 | Bodine | 209/1 |
| 3,172,744 | 3/1965 | Fortman et al. | 55/277 X |
| 3,681,009 | 8/1972 | Horsley | 55/277 X |
| 3,894,851 | 7/1975 | Gorman | 95/219 |
| 4,302,431 | 11/1981 | Atsukawa et al. | 422/172 X |
| 4,319,891 | 3/1982 | Anderson et al. | 95/29 |
| 4,475,921 | 10/1984 | Barmatz | 23/313 R |
| 4,529,422 | 7/1985 | Phillips | 55/270 |
| 4,848,656 | 7/1989 | Magill | 239/2.1 |
| 4,948,497 | 8/1990 | Ohkawa | 209/1 |
| 5,059,404 | 10/1991 | Mansour | 423/201 |
| 5,133,297 | 7/1992 | Mansour | 122/4 D |
| 5,197,399 | 3/1993 | Mansour | 110/345 |
| 5,205,728 | 4/1993 | Mansour | 431/1 |

FOREIGN PATENT DOCUMENTS

| | | |
|---|---|---|
| 1291189 | 2/1987 | U.S.S.R. |
| 1554949 | 4/1990 | U.S.S.R. |

OTHER PUBLICATIONS

Hueter & Bolt, "Physical Mechanisms for Sonic Processing", SONICS, Techniques for the use of Sound and Ultrasound in Engineering and Science, pp. 220–225, John Wiley & Sons, Inc. New York (Copyright 1955).

Reethof, "Acoustic Agglomeration of Power Plant Fly Ash for Environmental and Hot Gas Clean-up", Transactions of the ASME, vol. 110, pp. 552–557 (Oct. 1988).

Richards, et al., "Applications of Acoustics in Advanced Energy Systems", The American Society of Mechanical Engineers, Winter Annual Meeting, San Francisco, Calif., pp. 1–8 (Dec. 10–15, 1989).

Dyer, et al., "Acoustic Levitation by Oseen Drag", J. Acoust. Soc. Am., vol. 92:(4), Pt. 1, pp. 2207–2211 (Oct. 1992).

Primary Examiner—Robert J. Warden
Assistant Examiner—L. M. Crawford
Attorney, Agent, or Firm—Fitch, Even, Tabin & Flannery

[57] ABSTRACT

High temperature gas emissions from industrial power plant or environmental clean-up processes are subjected to an acoustic waveform having second harmonic content and appropriate second harmonic phase shift to impart a net acoustic Oseen force on particulate matter contained in the gas for removal of said matter. Particulate matter of 1 micron radius is positively excluded, while smaller particles are agglomerated by the sound wave. The acoustic waveform further enhances both sorption of injected sorbent particles for removal of sulfur oxides, and the efficiency of an in-line catalytic converter for removal of nitrogen oxides. The invention improves overall removal efficiency, can operate at very high temperatures, and does not produce any secondary waste, such as filters.

14 Claims, 5 Drawing Sheets

ACOUSTIC BARRIER SEPARATOR

BACKGROUND OF THE INVENTION

The present invention relates generally to methods and apparatus for the removal of gas borne solids in a thermal treatment process by the use of acoustic forces. More particularly, the invention is directed to the use of the acoustic force known as the Oseen force for the removal of particles from a high temperature flue gas.

A large variety of industrial power plant and environmental clean-up purposes are served by high temperature processing of fuels and contaminants, respectively. A common malady of these high temperature processes is the production of a hot gas or vapor flow with an undesirably high particulate content. A large number of Superfund applications require remediation of contaminated soil. Where these applications require handling of soils, as in excavation, conveyance, blending, thermal treatment, or deposition, engineers are faced with the problem of control of particulate emissions. Current stringent regulations place a ceiling on the level of particulate emissions which will be tolerated from the likes of coal-fired power plant flues or environmental clean-up emissions. Furthermore, it is desirable to remove particulates from a high temperature gas flow where such particulates may have an abrasive effect on downstream equipment. For example, the flue gas from a coal-fired boiler contains sulfur oxide gases, nitrogen oxide gases, and fly ash particulates which must be destroyed or removed before the clean gas is released into the atmosphere. Preferably the treatment is completed while the flue gas is at a high temperature such that it can spin a turbine or preheat air, without the abrasive effect of fly ash or the corrosive effect of acid anhydride gases.

High temperatures are also desirable in an application such as the remediation by an evaporation process of contaminated soil containing, for example, mercury. Removal of the volatile component or contaminant such as mercury by such an evaporation process must be carried out at a temperature above the dew point for the volatile substance, to prevent its condensation on the fly ash. For example, in a flue gas containing a mixture of mercury vapor, air, other vapors, and fly ash, the separation of the fly ash from the gas should take place near 400° C. to prevent condensation of mercury on the particulates. For a clay soil, many of the particulates in the fly ash will be below 1 micrometer in diameter.

As another example, mixed wastes, consisting of materials contaminated with both radioactive constituents and hazardous non-radioactive constituents, are desirably treated at high temperature. This is because it is highly desirable to separate radioactively contaminated constituents from hazardous non-radioactive constituents since there is no available disposal means for mixed wastes, whereas radioactive wastes and hazardous wastes can be individually managed through currently available and approved methods. In a mixed waste process, gas flow will entrain solid particulates carrying radioactive contaminants. To prevent recontamination of these particulates by gas-entrained hazardous condensables, a separation must be effected at temperatures well above the condensation point of the hazardous compound so as to avoid generation of a mixed waste residue.

Present particulate containment technologies include filtration, scrubbing, electrostatic precipitation, and cyclonic separators. These technologies represent a relatively high cost of installation and operation or simply cannot provide the performance required for specific applications.

Cyclonic separators operate at high temperature, which desirably allows the high temperature flue gas to be used in downstream equipment. However, such separators only separate particles with diameters greater than 5 micrometers. Furthermore, cyclonic separators are generally not efficient compared to other separator technologies. In a cyclonic separator, gas is forced to spin in a containment vessel and it is by means of centrifugal force that particles are spun outward to an outer wall where they drop to a collection hopper. The centrifugal force which can be reasonably generated is insufficient to cause particles of a diameter of less than 5 microns to spin outward to the outer wall, given the turbulent and viscous forces of the gas. Unfortunately, it has been shown that particles smaller than this, especially in the 1 micron range, are best absorbed and retained by the human pulmonary system, and thus may contribute to respiratory ailments such as bronchitis, emphysema and lung cancer.

Electrostatic precipitators came into commercial service in the early 1900s. Literally hundreds of discharge electrode configurations have been utilized. Electrostatic precipitators capture dust or fly ash by charging the individual particles and then accelerating them in an electric field until they come into contact with a grounded collecting surface. Agglomeration of the particles occurs at the collecting surface which allows the resulting agglomerates to be mechanically rapped or in some cases washed from the collecting surfaces into the hoppers below each collecting field. The efficiency of such precipitators is highly sensitive to particle resistivity. At the extremes of particle resistivity, both low and high, precipitator efficiency is negatively impacted. When particle resistivity is low, precipitator efficiency may degrade due to reentrainment of the collected dust. The combined effects of gas flow and the weight of the collected material act to dislodge and reentrain collected material in the gas flow. Further, when the collecting surfaces of conventional precipitators are rapped, some of the collected dust cake is redispersed in the gas stream as small particles.

With high particulate resistivity, a high voltage drop develops across the collected dust cake layer, resulting in the phenomenon know as "back ionization". Back ionization impedes the normal flow of negative ions, or positively discharges dust particles, ejecting collected particulates from the dust cake. In severe cases, the precipitation process essentially stops.

Unfortunately, at high temperatures, particulate resistivity generally decreases. Consequently, electrostatic precipitators cannot effectively operate at high temperatures.

Water spray scrubbers cannot operate above the steam point of 100° C. Baghouse filters also cannot operate at high temperatures. Furthermore, baghouse filters are susceptible to tearing. Finally, filters and water spray scrubbers result in an increase in the volume of waste materials, because the filters and water must be collected and disposed of as waste.

In a flue gas containing sulphur oxide gases and nitrogen oxide gases, such as from a coal-fired boiler, the injection of sorbent particles and ammonia gas ahead of a high temperature fabric filter has been practiced. The sorbent particles remove the sulphur oxide gases from the flue gas and are themselves removed by the filter along with the fly ash. The filter holds a catalyst for conversion of nitrogen oxides and ammonia to nitrogen and water. The fabric filters include the high cost of continuous fiber ceramic sleeves and are susceptible to clogging by condensable vapors. The destruction or removal efficiencies achieved with the filter system are only 70% for sulphur oxides, 90% for nitrogen oxides, and 99% for particulates.

There is a need in high temperature thermal processes employed in both the power plant industry and environmental clean-up industry for improved means of reducing the particulate and hazardous waste contents of a high temperature flue gas. In particular, there is a need for an efficient treatment which effectively removes small particles and enhances the action of sorbents and catalysts typically used for removal of sulfur oxides and nitrogen oxides, which treatment is completed while the flue gas is at a high temperature, such that the flue gas may be used in downstream equipment without the abrasive effect of fly ash or the corrosive effect of acidic gases. Finally, there is a need for a treatment which will not result in an increased volume of hazardous waste which must be disposed of.

SUMMARY OF THE INVENTION

The present invention provides an acoustic barrier separator and acoustic enhancement treatment for use in substantially and efficiently removing small- and larger-diameter fly ash and hazardous volatiles from high temperature gas emissions, such as the flue gas produced in a coal-fired boiler or high temperature remediation process. The invention is particularly suitable for use in efficiently removing small particulates at high temperatures that are not removed efficiently by prior art separation means at high temperatures.

According to the invention, the flue gas is subjected in a separator chamber to the output of an acoustic source, the amplitude, frequency and phase of which are selected to provide an Oseen force which acts on the fly ash particulates in the gas stream. The acoustic waveform exerts over time a net Oseen force on the particulates, which may be directed against the gas flow or may be directed laterally to the gas flow. An Oseen force directed against the gas flow overcomes the drag force of the gas flow on the particulates, and the particulates stagnate in the chamber and are subsequently collected. A laterally directed Oseen force moves the particulates laterally out of the gas flow toward a collection hopper.

The acoustic barrier of the present invention positively excludes particulate sizes above 2 micron diameter. The acoustic waveform furthermore enhances the agglomeration of smaller particulates with other smaller particulates and with larger particulates. The acoustic waveform creates an oscillating flow of gas around particles in the flue gas. Smaller diameter particles are entrained in the oscillating flow with respect to larger particles, which are essentially immobile, increasing the frequency of impacts between the entrained smaller particles and the immobile larger particles. Particles in close proximity are drawn together by the hydrodynamic (Bernoulli) force, and remain agglomerated by means of Van der Waal forces.

Furthermore, the acoustic waveform enhances the sorption of sorbent particles and conversion efficiency of catalytic agents, which may be injected into the flue gas upstream of the separator chamber to sweep up sulphur oxides and nitrogen oxides in the flue gas, and which are subsequently removed at the acoustic barrier or in a downstream catalytic converter. By means of the rapid and frequent relative motion of the gas molecules with respect to the sorbent and catalyst particles in the flue gas, induced by the acoustic waveform, sorbents and catalysts effectively sweep out greater amounts of such noxious gases.

No secondary waste is created by the present invention, in the form of water spray and filters. The invention may be operated effectively at very high temperatures. Hazardous volatiles may thereby be prevented from condensing on collected particles, simplifying remediation processes. Likewise, a relatively abrasive-free gas may be delivered to a downstream turbine or the like at a high temperature for maximum turbine efficiency.

The invention delivers sonic energy at a reasonable power cost, achieves high rates of particulate removal, enhances the removal of sulphur oxide and nitrogen oxide gases, can be operated at very high temperatures, and does not produce any secondary waste.

DETAILED DESCRIPTION OF THE PREFERRED EMBODIMENT

Figure 4:
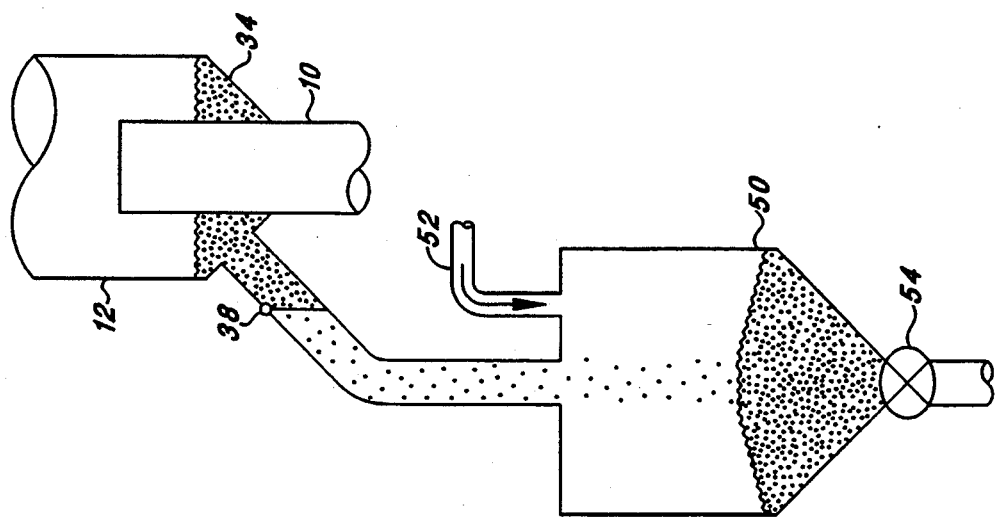
FIG. 4 is a sectional view of a vertical embodiment of a collected solids conveyor system for the present invention.

A basic refinement to Stokes' Law for the viscous drag force on particles in a fluid flow was provided by C. W. Oseen, "Ueber die Stokessche Formal und ueber eine verwandte Aufgabe in der Hydronamik", Ark. Mat. Astron. Fys. 6, 1–20 (1910); 9, 1–15 (1913). The need for this refinement arises due to the non-linear dependence of the viscous drag on the flow velocity. Oseen's solution for the drag force on a sphere in a steady fluid flow amounts to an expansion of Stokes' solution to the next order in Reynolds number, $$F = 6\pi\eta r u \left(1 + \frac{3}{8}\mathfrak{R}\right)$$

where $\eta$ is the fluid viscosity, r is the radius of the sphere, and u is the flow velocity past the sphere.

The first term in this expression is Stokes' Law. The second term is Oseen's refinement. These considerations for the drag force on a sphere due to steadily flowing fluid can be adapted to determine the average drag force on a sphere in an oscillating fluid flow associated with a traveling acoustic wave. Provided that the peak Reynolds number of this flow is small, and the acoustic wave length is much larger than the radius of the sphere, the results for a steadily flowing fluid are expected to apply for a traveling acoustic wave. The flow velocity u past a sphere in an acoustic field of a traveling sound wave is a periodic function of time and the force experienced by the sphere will also be a function of time. It is the time average of this force that is of interest. When averaged over a complete cycle of any purely periodic flow, the first term in the above equation vanishes since the time averaged fluid velocity of such a flow is zero. The second term is $$F_O = \frac{9}{4} \pi \rho r^2 (u|u|),$$

where $\rho$ is fluid density. This term can yield a finite average value depending on the time average of the product $u|u|$. The value of this Oseen-type moment depends on the Fourier content and intensity of the acoustic wave. For symmetric velocity waveforms, e.g., a pure sine wave, the Oseen-type moment is zero and the Oseen term in the force expression vanishes. For harmonically distorted waveforms, this moment can have a finite value implying the existence of a steady acoustic force on the sphere. The magnitude and direction of this force will depend on the amplitudes and relative phases of the Fourier components of the velocity waveform.

The acoustic Oseen effect is only one of the steady forces an acoustic field exerts on an object. Other steady sonic forces include: (a) the hydrodynamic attraction between objects (agglomeration) due to the periodic rush of fluid between them, (b) radiation pressure due to the scattering of the sound field by the object, and (c) the average Stokes' pressure due to a temperature dependence of viscosity in the adiabatic compressions of a sound wave. For particles greater than 2 micrometers in diameter in an Oseen-type, e.g., harmonically distorted, progressive wave, the radiation pressure and the average Stokes' force are small, compared to the Oseen force. The hydrodynamic attraction becomes important only when the particle separation becomes small, compared to particle diameters, and is in part responsible for particle agglomeration according to this invention. A more complete appreciation of these force components and their relationships is found with reference to T. F. Hueter and R. H. Bolt, *Sonics*, (John Wiley & Sons, New York, 1955).

The Oseen force is dependent on the magnitude and phase of the second harmonic component of the acoustic wave. The particle velocity of the sound wave may be written as:

$$u = u_o[\sin \omega t + c_2 \sin (2\omega t + \phi)]$$

in which $c_2$ is the fractional second harmonic content, $\phi$ is the phase of the second harmonic, and $\omega$ is the angular frequency. The time average of the force thus may be approximated as:

$$F_O \approx -3r^2 \rho u_o^2 c_2 \sin \phi$$

The maximum positive force away from the acoustic source thus occurs for a phase angle of $-\pi/2$.

The frequency spectrum of the acoustic wave used in the present invention preferably comprises a basic frequency and a superimposed frequency of twice the basic frequency value and phase shifted in relation to the basic frequency by $-\pi/2$. This phase shift maximizes the Oseen force in a direction away from the acoustic source. However, any phase shift between $-\pi/2$ and zero will create an Oseen force away from the acoustic source, if other considerations demand such a phase shift.

Figure 1:
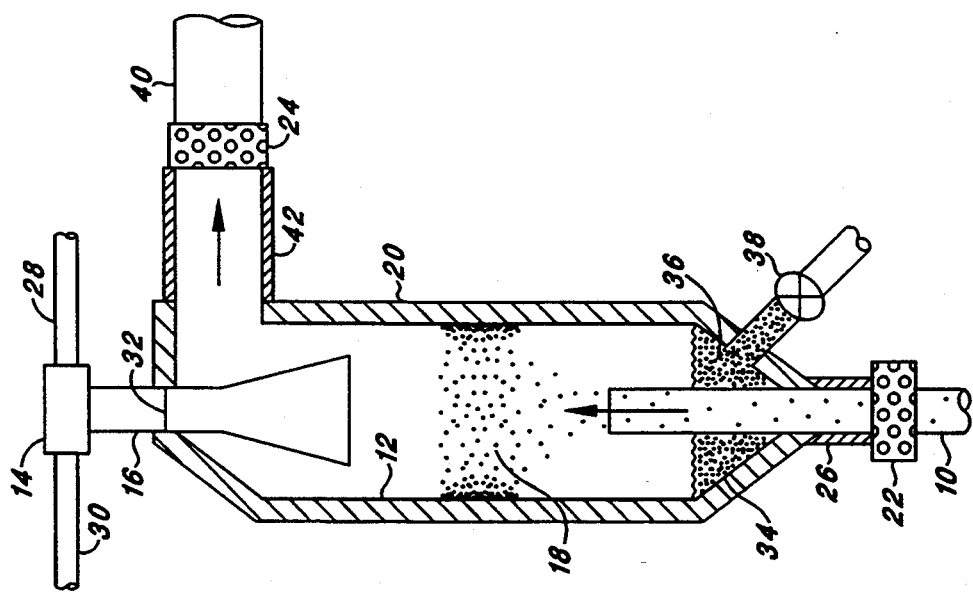
FIG. 1 is a sectional view of an acoustic barrier separator according to the present invention.

Turning now to FIG. 1, an acoustic separator according to one embodiment of the present invention is shown to comprise a gas introduction flue 10 for delivery of a high temperature flue gas containing solid particulates or fly ash, sulfur oxide gases, nitrogen oxide gases, or a combination thereof, into a chamber 12, where an acoustic waveform is directed from a siren 14 or set of sirens via a linearly tapering horn 16 against the gas flow. Particulates 18 are stagnated in the flow by the Oseen force. Chamber 12 preferably has a larger cross-section than either flue 10 or linearly tapering horn 16, and is made from a material resistant to high temperatures. The siren 14 is preferably a gas siren as known in the art, capable of delivering enough power to provide a sufficient Oseen force to overcome the drag force of the gas.

An insulating layer 20 is employed around chamber 12 for reducing the amount of noise to which workers in the area of the chamber are subject. Since the chamber is at a high temperature during use, a high-temperature resistant, sound-damping material, such as fiber glass, may be used to encase the chamber 12 and the conduits leading into and out of the chamber. Alternatively, the chamber may be contained and supported in an outer jacketing chamber, where air has been withdrawn from the space between the jacketing chamber and the separation chamber 12, to provide a vacuum insulation. Mufflers 22 and 24 are also preferably located both upstream and downstream from the chamber 12 to further dampen the noise of the apparatus. Any muffler known in the art which is suitable for the operating conditions described herein may be used. For example, one type of muffler that may be used is of the Helmholz type, which is well known in the art. Flue 10 may be covered from muffler 22 to the chamber 12 with an insulating jacket 26, such as fiber glass.

The temperature of the flue gas may be very high, for example sufficiently high to prevent the condensation of semi-volatile organics or other hazardous vapors on the solid particulates. The acoustic waveform has substantial second harmonic content, preferably about equal to the fundamental harmonic content, which is generated by shaping the apertures of the siren 14, or alternatively by providing in addition to a first set of siren apertures a second set of siren apertures emitting sound at twice the fundamental frequency emitted by the first set of apertures.

The siren 14 or sirens may be located remotely from the chamber 12, and thus maintained at a temperature lower than the high temperatures at which the apparatus is desirably operated. According to the preferred embodiment, the siren 14 is a gas siren, and thus the air flow through the siren from conduit 28 and to conduit 30 is used to cool the siren and isolate it from the high temperatures of the flue gas. Construction of a gas siren is well-known in the art, and is furthermore taught in the Ph D thesis of F. G. Pla, "An Experimental and Theoretical Study of High Intensity, High Efficiency Sirens", Pennsylvania State University, 1987, available from UMI Dissertation Services.

The sound field from the siren is expanded through an exponential horn and is then transmitted through an isolator 32 to attenuate the gas flow associated with the siren operation. A sheet of felted, woven and sintered stainless steel may be used as an isolator. The sound is then propagated through horn 16 before being radiated into the separation chamber. Horn 16 comprises an inside shell and an outside shell, as is typical of such horns and well known in the art, and it is preferable that the area of the annular region formed between the shells in cross-section is about the same as the cross-sectional area of the flue 10. As a consequence, horn 16 may start from an outer diameter approximately equivalent to that of flue 10, and expand to an outer diameter of almost that of the chamber 12. There should remain, however, sufficient space between the outer shell and the chamber wall for adequate flow of flue gas beyond horn 16.

Preferably, as previously mentioned, the Oseen force is maximized away from the acoustic source by selecting the phase of the second harmonic component to be $-\pi/2$ radians with respect to the fundamental frequency employed. The Oseen force on a particle is further maximized by selection of a fundamental frequency high enough that the particle inertia prevents entrainment in the acoustic wave oscillations. The particle displacement is then less than the gas displacement in an acoustic cycle, and the particle "slips" with respect to the gas. For a particle diameter of 4 micrometers, or less, the frequency is preferably greater than 5 kHz to maximize the force. The fundamental frequency employed in practice may be optimally selected by trial and error, or according to the requirements for acoustic enhancement of sorption, agglomeration, or catalytic conversion, or according to the limits of gas siren design. Typically, the fundamental frequency may be in the audible range, and in particular in the range of 500 Hz to 8,000 Hz.

The power of the siren is selected such that the second harmonic content of the acoustic waveform develops a substantial Oseen force sufficient to balance the Stokes drag force on solid particulates in the flue gas flow. The Stokes drag force is of course in the direction of the gas flow. Solid particulates stagnate in the gas flow under the Oseen force, and move toward the outer walls of the chamber 12, where the flow velocity decreases to near zero. The particulates 18 migrate to the walls for two reasons. First, since the acoustic power is directed out of the horn 16 which is shown as having a smaller cross section than the cross section of the entire chamber 12, and thus approximates a point source, the acoustic waveform generates not only a large force component directed against the flow of gas, but also a substantial lateral force component which drives the stagnating particulates towards the walls of the chamber 12. Additionally, as the flue gas enters chamber 12 from gas introduction flue 10, the flow of the gas diverges to fill the greater diameter of chamber 12, as shown in FIG. 1, thus also providing lateral momentum outward to the walls of the chamber.

At the outer walls the Stokes drag force due to the flow of the flue gas diminishes and the solid particulates 18 drop down under the combined forces of gravity and the Oseen force into a solids collection hopper 34 located at the base of the chamber 12. The solids collection hopper 34 may be emptied of collected solids 36 by means of a discharge valve 38. Discharge valve 38 controls the amount of solids maintained in the solids collection hopper 34, which amount is kept at a predetermined level to facilitate proper absorption of acoustic energy, as discussed below.

Flue gas which is substantially free of solid particulates exits the chamber 12 via an exit flue 40, which may be covered with an insulating jacket 42 of fiber glass or the like, similar to insulating jacket 26. A muffler 24 reduces noise coming out of the chamber 12 via flue 40.

Separation chamber 12 is of sufficient size to accommodate adequate gas flow for a desired application, and may typically have a radius of about 0.3 meters or so. Gas introduction flue 10 may then be about 0.1 meters in radius or so. There should be sufficient space between the chamber walls and the flue 10 to allow collected fly ash 36 to accumulate in hopper 34 to form an adequate sound absorbing layer. Therefore, the flue 10 should also protrude in chamber 12 high enough to allow for the accumulation of solids 36 to build to a depth sufficient for sound dampening purposes. A typical protrusion height is in the range of about 0.15–0.3 meters or so. Chamber 12 is preferably long, providing a length between the end of flue 10 and the end of horn 16 equivalent to a many times the diameter of the chamber. For example, the chamber may provide a distance between flue 10 and horn 16 at least six times greater than the diameter of the chamber. Horn 16 projects into chamber 12 for a distance sufficient to allow the turbulent effect imparted to the gas by the transition from the chamber space to the space around the horn to die out. For example, it is generally sufficient for horn 16 to protrude about several horn outer diameters into the chamber 12.

The Oseen force for these criteria may be written as:

$$F_O = 3r^2 \frac{P^2}{\rho c^2}$$

where r is the radius of the solid particulate, P is the rms sound pressure amplitude, $\rho$ is the gas density, and c is the speed of sound, assuming the phase of the second harmonic component is selected to maximize the Oseen force away from the source, that is, it is about $-\pi/2$. In order for particulate stagnation to occur, this force must oppose the Stokes drag force, $$F_{Stokes} = 6\pi r \eta \nu$$

where $\nu$ is the velocity of the flue gas flow. Generally, the force of gravity is negligible for micron or submicron sized particulates in comparison to these acoustic forces. Therefore, the power of the acoustic waveform may be chosen according to the requirement that:

$$P = \sqrt{2\pi\eta\rho c^2 \frac{\nu}{r}} .$$

By way of example, with the appropriate second harmonic phase, and second harmonic content about on the order of fundamental harmonic content, the following parameters of:

| | |
|---|---|
| viscosity | $\eta = 2.7 \times 10^{-5}$ kg m$^{-1}$ s$^{-1}$; |
| density | $\rho = 1.3$ kg m$^{-3}$; |
| sound speed | $c = 330$ m s$^{-1}$; |
| gas speed | $v = 1$ m s$^{-1}$; and |
| radius | $r = 10^{-6}$ m, | require a root mean square (r.m.s.) sound pressure P of $4.9 \times 10^3$ N m$^{-2}$, corresponding to a sound intensity on the order of 56 kW m$^{-2}$, or about 168 dB above 1 picowatt/m$^2$. This acoustic barrier will positively exclude particles as small as 1 micron in radius.

According to the present invention, the acoustic waveform also enhances agglomeration of particles, and therefore in the above example, even smaller particles will be effectively excluded. With agglomeration it becomes unnecessary to select a high sound intensity which will positively exclude the smallest particulates desirably removed, but rather lower power levels may be selected which, in combination with the agglomerating effect of the acoustic waveform, will effectively agglomerate said smallest desirably removed particulates and exclude them at their larger, agglomerated diameters. Since sound intensity is proportional to the square of the pressure amplitude, positive exclusion of particles of 1 micron radius requires only a tenth as much power as is required to positively exclude particles of 0.1 micron radius, for example. Yet particles as small as 0.1 microns radius will in fact become agglomerated and subsequently excluded at the aforementioned 168 dB.

Agglomeration is enhanced by acoustic entrainment of particles, as described in G. Reethof, "Acoustic Agglomeration of Power Plant Fly Ash for Environmental and Hot Gas Clean-up", Journal of Vibration, Stress and Reliability Design, Vol. 110, pp. 552–557, October 1988, the teachings of which are incorporated by reference. For a typical acoustic sound intensity of about 160 dB, the acoustic r.m.s. velocity is on the order of 5 m/sec. At a frequency of 2000 Hz, a small particle may flit back and forth 2000 times a second over a distance of about 2,500 microns. Larger particles remain essentially at rest, sweeping up smaller particles which flit by every acoustic cycle. It has been shown that these swept-out volumes refill with small particles within one or a few periods of the acoustic waveform. Smaller diameter particles are thus entrained in the oscillating flow with respect to larger particles, which are essentially immobile, increasing the frequency of impacts between the entrained smaller particles and the immobile larger particles. Particles in close proximity are drawn together by the hydrodynamic (Bernoulli) force, and remain agglomerated by means of Van der Waal forces.

By way of example, an acoustic source of 159 dB at 2530 Hz, even without substantial second harmonic content, applied in the direction of gas flow having 30.2 grams of dust per cubic meter is capable of causing an order of magnitude decrease in 1 micron diameter particulates and a doubling of 20 micron diameter particulates, as measured by a cascade impactor.

The degree of agglomeration which occurs is proportional to the length of time the flue gas particulates are exposed to the acoustic waveform. Therefore, the length of chamber 12 may be adjusted accordingly with respect to the flue gas input rate to achieve the desired time exposure.

Figure 2:
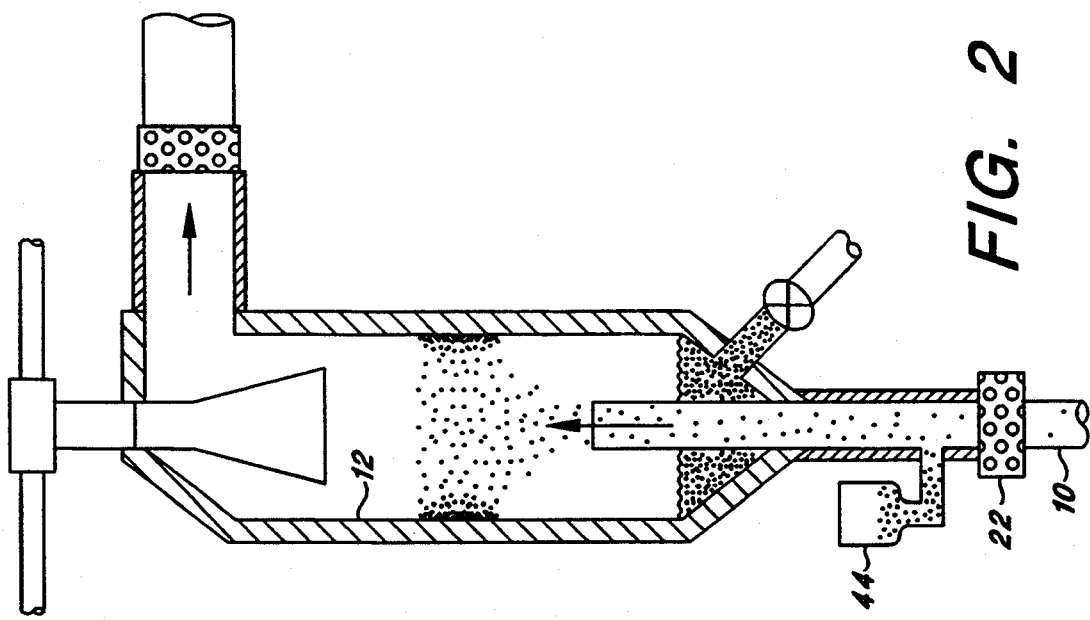
FIG. 2 is a sectional view of an acoustic barrier separator with a sorbent injection system.

In some instances, it is desirable to utilize the present invention in conjunction with the injection of sorbent particles for the removal of sulfur oxides and the like from the flue gas, as depicted in FIG. 2. Therein is shown a sorbent particulate injection system 44, located upstream from the chamber 12, between the chamber and the muffler 22, and disposed to inject sorbent particles into the gas stream flowing in flue 10. As previously practiced in the art, the sorbent particles so injected into the flue gas sweep up the sulfur oxide gases, and are themselves subsequently removed by filtration. Absent the application of an acoustic waveform to the gas flow, molecular diffusion and turbulent transport of sorbent particles fail to explain the destruction and removal efficiencies (DREs) for sulfur oxides observed in the prior art, so that removal of the sulfur oxides must be effected at a dense layer of dust and sorbents located on a filter in a typical baghouse filter system. These DREs are typically about 70%. The application of an acoustic waveform according to the present invention enhances adsorption of sulfur oxides to injected sorbent particles through increased relative motion, and simultaneously provides for stagnation of the sorbent particles in the gas flow by means of the Oseen force, without the use of baghouse filters.

An acoustic wave in a gas produces an oscillating fluid velocity having an r.m.s. magnitude of:

$$\overline{u} = \left[\frac{I}{Z}\right]^{\frac{1}{2}}$$

where I is the sound intensity and Z is the acoustic impedance. The peak-to-peak displacement of a gas molecule is given by:

$$d = \frac{\sqrt{2}}{\pi} \frac{\overline{u}}{f}$$

where $f$ is the acoustic frequency. For an acoustic source of 160 dB (I = $10^4$ W/m$^2$), an acoustic impedance Z of 400 kg m$^{-4}$ sec$^{-1}$, and a frequency $f$ of 2000 Hz, the r.m.s. fluid velocity is expected to be about 5 m/sec, and the gas molecule peak-to-peak displacement is on the order of 1000 microns. A solid particulate in the gas flow undergoes a displacement x, which is less than the displacement d of the gas molecules, because of its greater inertia. For a particulate velocity dx/dt much less than the r.m.s. fluid velocity, the ratio of the particulate displacement to the gas molecule displacement, called the entrainment parameter, is given by:

$$\frac{x}{d} = \frac{9\eta}{4\pi \sqrt{2} \, \rho r^2 f}.$$

In order to increase the relative motion of the sulfur oxide gases with respect to the sorbent particles, it is desirable to provide for an entrainment parameter substantially less than 1. In particular, given an expected flue gas viscosity, the sorbent particle diameter r and the frequency $f$ of the acoustic waveform may be chosen to provide a small entrainment parameter according to the above equation.

By way of example, using typical values of:

| | |
|---|---|
| viscosity | $\eta = 2 \times 10^{-5}$ kg m$^{-1}$ s$^{-1}$; |
| density | $\rho = 2 \times 10^{3}$ kg m$^{-3}$; |
| frequency | f = 2000 Hz; and |
| radius | r = 4 microns, | the entrainment parameter is approximately 0.16, which indicates that sorbent particulates are substantially at rest compared to the motion of the gas molecules. As a result, the frequency of collisions between sulfur oxide molecules and sorbent particulates is greatly enhanced by the acoustic waveform, which causes the gas molecules to flit back and forth about 2000 times a second over a distance of 1000 microns, with respect to the relatively motionless sorbent particulates.

The characteristic time to sweep out the entire gas volume of the chamber into which sorbent particulates have been injected, and to which an acoustic waveform is applied, is:

$$\tau = \frac{1}{\sqrt{2}\, r^2 \bar{u} n_s},$$

where $n_s$ is the injected sorbent particle density. The number of such sweeps in a time $t = L/u_0$, where $u_0$ is the flue gas flow velocity, and L is the length of the chamber to which the acoustic energy is applied, is given by:

$$\frac{t}{\tau} = n_s r^2 \left(\frac{L}{u_0}\right)\left(\frac{2I}{Z}\right)^{\frac{1}{2}}.$$

The attenuation of the acoustic waveform in a dusty gas such as a flue gas occurs in a length $$L_A = \frac{Z}{6\pi \eta n_s r},$$

so that the number of sweeps within the attenuation length is $$\frac{t}{\tau} = \frac{r\sqrt{2ZI}}{6\pi \eta u_0}.$$

For typical parameters used above for sorbent particle radius, impedance Z, intensity I, viscosity $\eta$, and a flue-gas flow velocity of 1 m/s, the volume is swept by the sorbent particles about 30 times in the time it takes those sorbent particles to travel the attenuation length. This corresponds to a very high DRE, given by:

$$DRE = 1 - e^{-\frac{t}{\tau}}$$

for sulfur oxide molecules.

The attenuation length may be impractically long for typical separator chambers, such as 120 meters for an injected sorbent particle concentration of about 2 billion particles per cubic meter at the aforementioned parameter values, and in any case, such a high DRE is not typically called for. Generally, the limit on the mass density of dust and contaminants allowed in flue gas emissions and the acoustic barrier particulate separator DRE will control the injected sorbent particle concentration, the length of the acoustic exposure, the frequency, and the selection of the sorbent particle size. By way of example, for an allowable emission content of $2 \times 10^{-5}$ kg m$^{-3}$ and an acoustic barrier particulate separator DRE of 99%, with the aforementioned parameters, the length of the chamber is about 10 meters, and a concentration of approximately 3.7 billion 4-micron sorbent particles per cubic meter may be injected to achieve a DRE for sulfur oxides in the flue gas of 98.5%, with $t/\tau$ equal to 4.2 sweeps for the transit of the gas through the chamber.

It is preferable to use a sorbent particle having a radius of about 2 microns. Sorbents which may be used include CaO, Ca(OH)$_2$, and CaCO$_3$. In order to maintain a low entrainment parameter, the frequency should be adjusted accordingly. In a preferred mode of the present invention, the flue gas flowing at 1 m/s may be exposed to an acoustic waveform having an intensity of 160 dB and a frequency of 8,000 Hz in a chamber of about 10 meters length, throughout which sorbent particles having a radius of about 2 microns are injected at a concentration sufficient to yield a DRE for sulfur oxides of 99.98%, corresponding to approximately 8.4 complete sweeps of the gas volume by sorbents during the time of transit through the chamber. Sorbents are then subsequently agglomerated and/or positively excluded by the acoustic waveform in an acoustic barrier separator as described above.

Figure 3:
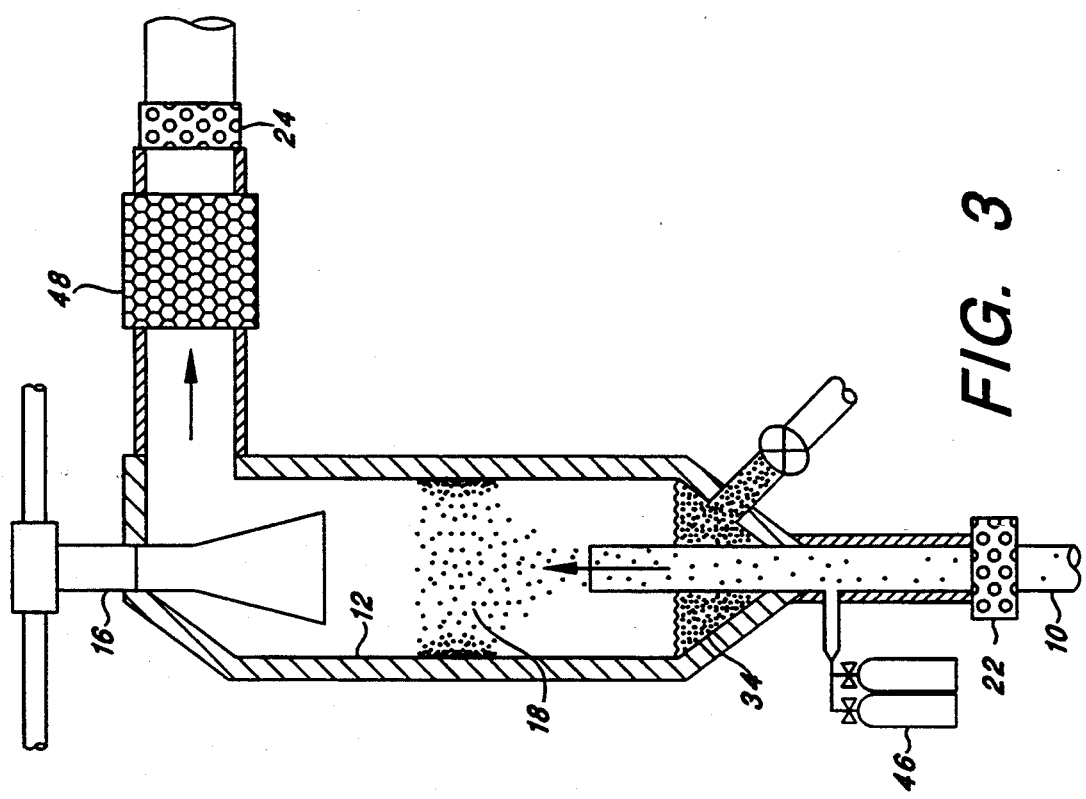
FIG. 3 is a sectional view of an acoustic barrier separator with a catalytic converter system.

In order to remove nitrogen oxide gases from a flue gas, it is desirable to combine a catalytic converter with the acoustic barrier of the present invention, as is shown in FIG. 3. Therein is shown an ammonia injection system 46, disposed to inject ammonia gas into the gas flue in flue 10 upstream from chamber 12, between the chamber and the muffler 22, and a catalytic converter 48 located downstream from chamber 12, between the chamber and the muffler 24, containing a catalyst such as calcium sulfate on a coarse grid for converting noxious NO$_2$ gases in combination with ammonia into N$_2$ and H$_2$O. Such systems are well-known in the art. The acoustic waveform enhances the number of interactions between catalyst particles fixed in the grid and the passing flue gas. In particular, the acoustic waveform increases the number of interactions by a factor of $$\frac{\sqrt{2}}{\pi}\left(\frac{\bar{u}}{u_0}\right).$$

The catalytic converter 48 is preferably located downstream from the acoustic barrier where particles stagnate in the flow, so that particulates and sulfur oxide sorbents which are capable of degrading catalytic efficiency are absent from the gas stream which passes through the converter. Furthermore, the catalyst is located on the clean side of the coarse grid which supports the catalyst.

According to the present invention, the flow of the flue gas and dimensions of the separator chamber are selected such that the gas flows turbulently between the horn 16 and the flue 10. Turbulent flow is preferable in this region over laminar flow because the velocity profile of the flue gas is flatter than under laminar flow. Given a flatter gas velocity profile, the central flow velocity required for a given throughput diminishes, thus relaxing the threshold acoustic intensity for the requisite stagnating Oseen force. The present invention may be practiced with laminar flow as well, however, the acoustic intensity required to positively exclude a given diameter particulate will be relatively greater because of the greater gas flow velocity at the axial center of chamber 12. Laminar flow is distinguished in that the flow velocity at the axial center of a tube is about twice the average flow velocity.

As mentioned above, absorption of the acoustic power to prevent resonance and standing wave phenomenon may be obtained by maintaining a predetermined level of solids in the solids collection hopper 34. The level of solids in the hopper may be monitored by a number of well-known techniques in the arts including proximity detectors using acoustic frequency emissions, which measure the time of reflection of an incident signal to gauge the distance to the top of the solids in the hopper.

The maintenance of this level is controlled by discharge valve 38. FIG. 4 shows a vertically configured system for conveying collected solids from discharge valve 38. As solids collect in the solids collection hopper 34, discharge valve 38 is opened to allow a controlled amount of solids to drop under the combined forces of gravity and acoustic pressure into a solids storage bin 50. The acoustic pressure provides a driving force away from the acoustic source and vibrational agitation akin to "rapping" which is used in electrostatic precipitators to settle the solids. A purge gas is pumped into the solids storage bin 50 via conduit 52 to maintain a positive pressure within the bin 50 and prevent the intrusion of gases from the chamber 12. The purge gas is used because flue gases in chamber 12 may comprise volatiles or hazardous gases which are desirably separated from the collected solids, as in soil remediation or separation of radioactive wastes from hazardous volatiles, for example. The purge gas also serves to cool the collected solids. A valve 54 allows the bin 50 to be emptied.

Figure 5:
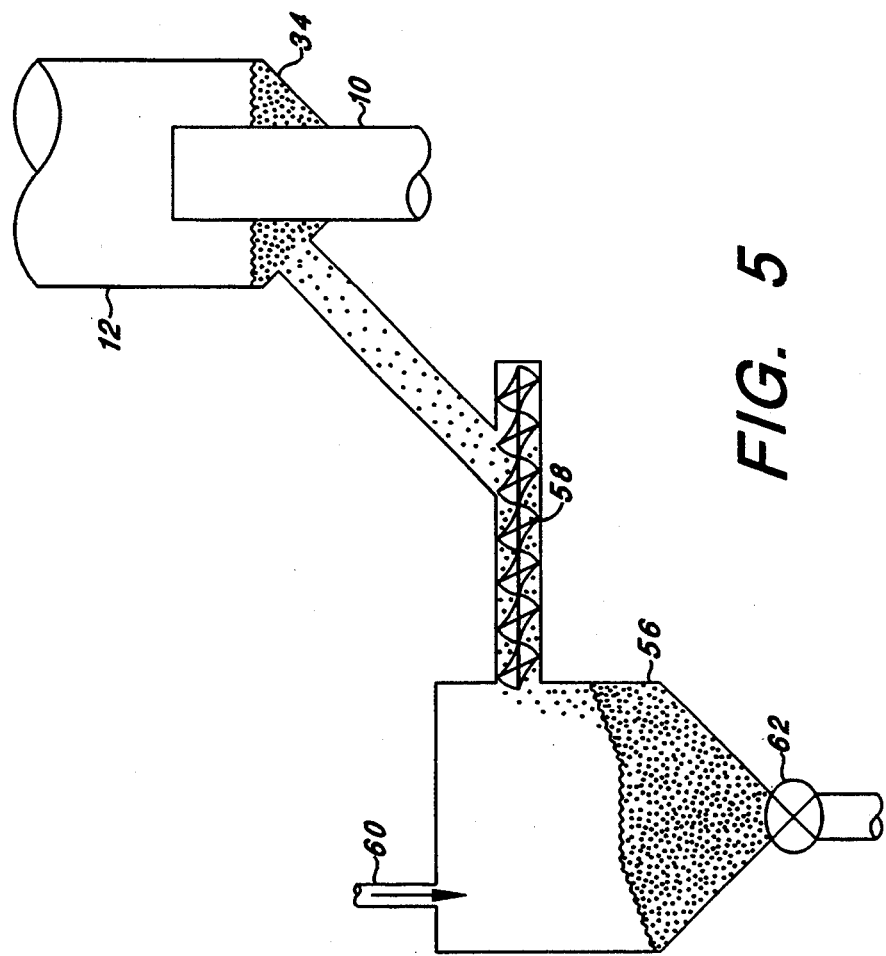
FIG. 5 is a sectional view of a horizontal embodiment of a collected solids conveyor system for the present invention.

Alternatively, a horizontal conveying system as shown in FIG. 5 may be used for conveying collected solids from the solids hopper 34 to a solids storage bin 56. A screw conveyor 58 controls the rate at which the collected solids are removed from the hopper 34, and thus controls the level of solids maintained in the hopper for acoustic absorption purposes. A purge gas may be introduced via conduit 60, and the bin 56 may be emptied through valve 62.

Figure 6:
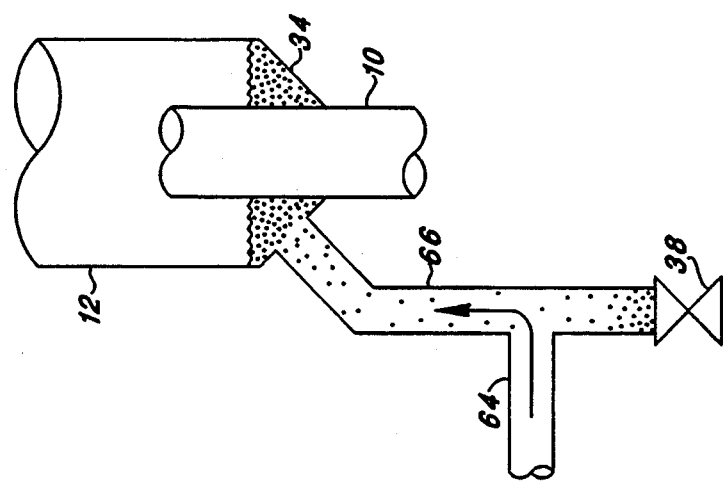
FIG. 6 is a sectional view of a purge-gas system for use in the present invention.

A conduit 64 for introducing a clean purge gas for separation of collected solids from a contaminated flue gas may also be located above the valve 38, as shown in FIG. 6. The purge gas flows upwards against the downward flow of collected solids under combined force of gravity, acoustic pressure, and flue gas pressure, thus providing incipient fluidization and acquiring thermal energy from the solids. The length of standpipe 66 may be selected so that the purge gas substantially attains the prevailing process temperature before entering the main flue gas chamber. This ensures that condensible contaminants will not condense on solids in the collection hopper 34.

Figure 7:
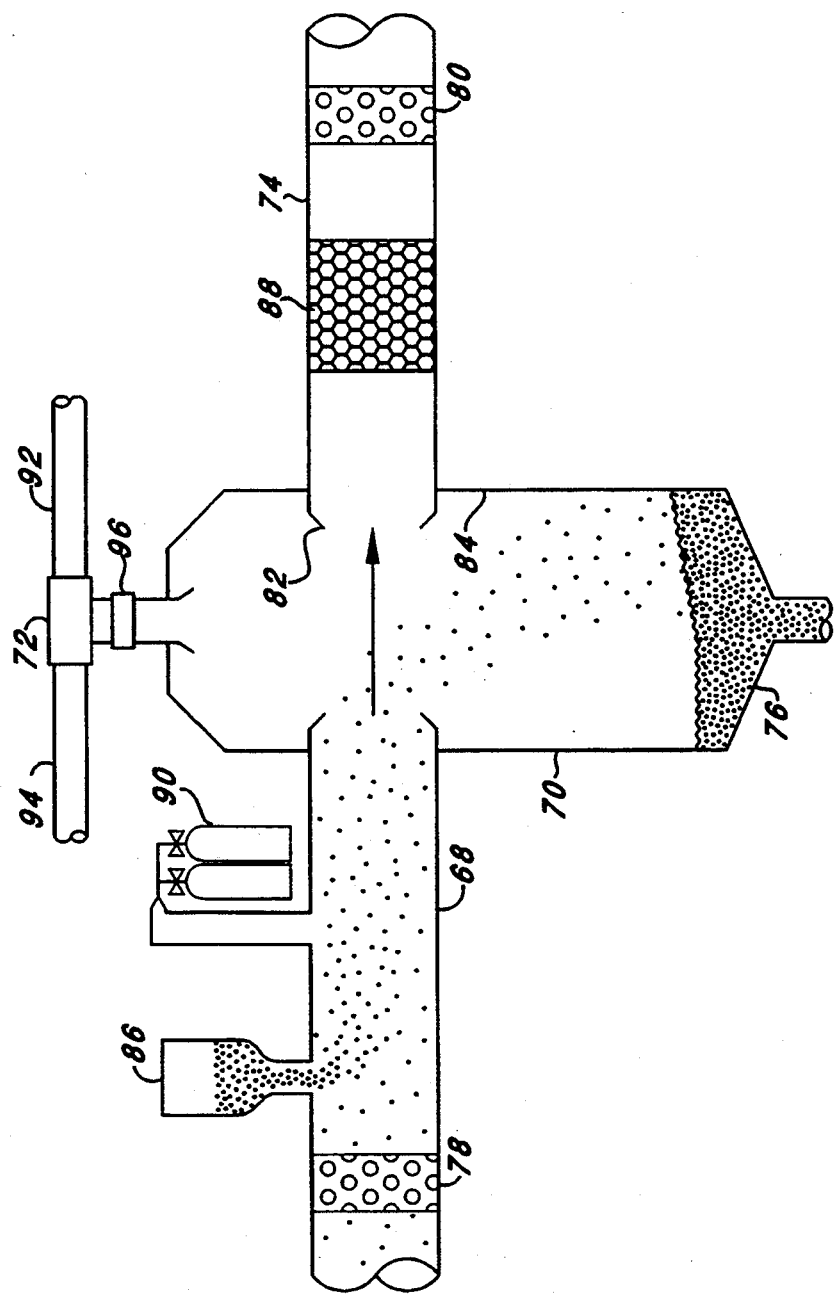
FIG. 7 is a sectional view of another embodiment of an acoustic barrier separator according to the present invention.

In FIG. 7 is shown another embodiment of the present invention, according to which an acoustic waveform exerts an Oseen force on particulates in a flue gas, the direction of which force tends to deflect the particulates laterally out of the flow. Flue gas flows from a conduit 68, through a chamber 70 orthogonally to the direction of propagation of an acoustic waveform from an acoustic source such as a gas siren 72, and out of the chamber via a conduit 74. Particulates and sorbents are deflected from the flue gas flow by the acoustic Oseen force during transit through the chamber 70. These deflected solids are collected in a solids collection hopper 76 located laterally from the axis of flue gas flow. As needed for maintaining proper operation of the invention, a level sensor may be placed on the inside wall of the chamber 70, preferably close to the surface of the solids that are collected in the solids collection hopper.

Chamber 70 and conduits 68 and 74 may be insulated as described above for the embodiment shown in FIG. 1 to reduce the overall noise given off by the entire apparatus. Similarly, mufflers 78 and 80 may be located upstream and downstream, respectively, from the chamber 70, to further reduce the noise which may escape from the apparatus.

In particular, the flue gas may be made to flow horizontally, the acoustic waveform may be applied from above at substantially 90° to the direction of the flue gas flow, and solids may be collected beneath the location of application of the acoustic waveform to the flue gas flow. An intensity of sound should be used which will create a substantial particle velocity component orthogonal to the flow of the gas, such that in the time it takes a particle to traverse the width of the chamber 70 between conduit 68 and conduit 74, the particle is carried sufficiently away from the opening 82 of conduit 74, and strikes either the solids collection hopper 76 or at least the far wall 84 of the chamber 70. Such a trajectory is described by an angle $\Theta$ taken from the horizontal gas flow vector, which requires an intensity of:

$$I = \frac{2\pi \eta u_0 c}{r} \tan \theta$$

where $u_0$ is the flue gas flow velocity, c is the speed of sound, r is the particulate radius desirably positively excluded, and $\eta$ is the gas viscosity. The dimensions of the chamber 70 may advantageously be flexibly selected based on criteria for the thermal process other than the intensity, as the intensity of the required acoustic waveform is largely dependent only on the angle $\Theta$, with the nominal condition that the duration of exposure to the Oseen force is sufficient to cause a particle entrained in the flow to traverse a distance orthogonal to the gas flow of at least the diameter of the conduits 68 and 74. For a viscosity $\eta$ of $2 \times 10^{-5}$ kg m$^{-1}$ sec$^{-1}$, a sound velocity c of 300 m/sec, a gas flow velocity of 1 m/sec, and a particle radius of 2 microns, by way of example, an intensity of 38 kW/m$^2$, or 166 dB is required to attain an orthogonal particle velocity twice that of the gas flow velocity.

An acoustic intensity of 168 dB is preferably used, which attains an angle $\Theta$ of about 70°, or a ratio of orthogonal particle velocity to gas flow velocity of about 3.16. Such an intensity furthermore provides substantial agglomeration, as disclosed above. The second harmonic content of the acoustic waveform should be maximized within the reasonable limits of the acoustic source equipment used, and more particularly should be on the order of the fundamental harmonic content of the acoustic waveform. The phase of the second harmonic is preferably selected to be $-\pi/2$. The fundamental frequency of the waveform may be in the range 500 Hz to 8,000 Hz.

Deflection of particulates does not create a problematic pressure drop in the flue gas since the flow velocity along the original flue gas velocity vector remains unchanged. The flue gas itself is only negligibly deflected by the tangential motion of the particulates because generally the total gas mass is much greater than the total particulate mass.

Further according to the embodiment shown in FIG. 7, a sulfur oxide sorbent particle injection means 86 is located upstream from the chamber 70, between the chamber and muffler 78. Such an injection means may be any one of various means widely known in the art for injecting such sorbents into a flue gas for sweeping up sulfur oxide gases. The sorbent injection means 86 is preferably located about ten meters upstream from the entrance to the chamber 70.

Acoustic energy is provided to the sorbent particles in the flue gas along a 10-meter distance between the point of injection and the entrance to the chamber 70 by the acoustic source 72, some of the energy of which travels out of chamber 70 and into conduit 68. The chamber 70 and conduits 68 and 74 are designed according to well-known requirements in the field of acoustic waveguides to provide for this transmission of some of the acoustic energy into the conduit 68. In particular, with an acoustic source intensity of 168 dB, it is desirable to allow acoustic energy of about 160 dB intensity to propagate into conduit 68 for the purpose of enhancing the effectiveness of the injected sorbents.

The radius of the injected sorbent particles is preferably in the range of about 1 micron to about 5 microns, and more particularly is about 2 microns. Sorbents which may be used include CaO, Ca(OH)$_2$, and CaCO$_3$. The fundamental frequency of the acoustic waveform is then preferably about 8,000 Hz.

A catalytic converter 88 as known in the art may be employed in conduit 74 downstream from chamber 70, between the chamber and muffler 80, for removal of nitrogen oxides from the flue gas. The converter comprises a coarse grid which supports a catalyst such as calcium sulfate. Ammonia is injected into the flue gas at ammonia injection means 90, located between the chamber 70 and muffler 78.

Gas siren 72 is powered by a process gas flowing in via conduit 92 and flowing out via conduit 94. The siren is effectively isolated from the high temperatures of the separation chamber 70 by an isolating seal 96, which is acoustically transparent. A sheet of felted, woven and sintered stainless steel may be used as a seal.

Example 1

An experimental test of the acoustic barrier described above was conducted in a glass apparatus configured substantially as shown in FIG. 1, absent the mufflers 22 and 24, and with a loudspeaker substituting for the siren 14. The glass apparatus included a glass tube, used as the chamber 12 or separator tube, having a length of approximately 50 cm and a diameter of 3.2 cm. The acoustic wave, or sound, was introduced through a linearly tapered horn at the top of the tube. Nitrogen gas was introduced from the bottom of the tube through a small diameter inlet (0.5 cm diameter) that passed through a fluid bed cone. The gas exited past the horn through a gas exit tube. Particulates were retained on a filter which could be removed and weighed.

With the sound turned off, i.e., in the absence of an acoustic wave, a 0.25 gram sample of dust was placed in the small diameter gas inlet, and the gas was valved on through a flow controller set to 1000 sccm. The dust was fluidized in the fluid bed cone, and any particulates having a diameter of 40 micrometers or less were entrained in the gas and were carried upward through the gas inlet, through the separator tube, and out through the gas exit port. The peak gas flow speed was 8 cm/s in the gas inlet and exit tubes, and was estimated to be 4 cm/s in the separator tube (twice the equilibrium flow value). The gas was allowed to flow through the tube for 2 minutes. The flow was then stopped and the filter was removed and weighed the next day (after rehumidification) to determine the mass of the particulates.

The test was repeated with the sound turned on, i.e., in the presence of an acoustic wave. With the sound turned on, the dust was observed to stagnate in a cloud just beyond the gas inlet tube. Much thinner clouds were also evident spaced a half wave apart along the separator tube, indicating a standing wave component due to acoustic reflection at the gas inlet. The dust clouds dissipated over about 1 minute as particles collected on the wall of the separator tube and fell into the collection hopper.

Three types of dust were tested as described above: graphite, diatomaceous earth, and bone char. After conducting the test, the gas inlet end was removed from the separator tube and a movable calibrated microphone probe was inserted through 5 inches of low density foam to determine the sound intensity in the separator tube under conditions of minimal reflection. The microphone generated a voltage signal proportional to acoustic pressure. The pressure signal was found to be constant to within 10 percent as the axial position of the microphone probe was varied.

The percentage of the particulate mass remaining in the flow as a function of sound intensity was determined. At low sound intensity, the particulate mass for the graphite dust was larger than that for nosound because the fluid bed was more agitated when the sound was on. At a high sound intensity, the removal efficiency varied from 94% for graphite dust to 99% for bone char dust, with the removal efficiency increasing with the sound intensity.

The filters were examined by microscope to determine a cutoff diameter, defined as that diameter where 99% of the particulates retained on the filter are smaller than the cutoff diameter. The cutoff diameter was found to vary from about 40 micrometers at low sound intensity to 4.5–8 micrometers at the highest intensity used. The data obtained reasonably follow the stagnation condition that the diameter cannot exceed a critical value inversely proportional to the intensity. The data, when plotted, project to a 1 micrometer cutoff radius near an intensity of 154 dB, corresponding to a 168 dB requirement for a 1 m/s flow in an industrial device.

The fundamental sound frequency in the test was 1200 Hz. At this frequency, the power amplifier gain was comparable for the fundamental and second harmonic. Tests at 600 Hz and 5000 Hz with the same waveform input gave lower particular removal efficiency. A sine wave input at 1200 Hz also gave lower removal efficiency. A strong resonance was present in the test apparatus near 1000 Hz that was very effective in cleaning dust from the glass tubulations between tests.

Probe measurements for the sound intensity in the separator tube with the gas inlet end still in place indicated a standing wave ratio of 6 at 1200 Hz and only 1.6 at 2400 Hz. For a high density of dust in the gas flow, the acoustic power was efficiently absorbed by the dust itself such that the reflected power was low. However, for low dust density the test apparatus acted like a resonant cavity (driven somewhat off resonance in the tests) for the fundamental. The second harmonic continued to be essentially a unidirectional traveling wave that was largely absorbed in the termination. Such a configuration is calculated to retain a large net Oseen force.

Example 2

Figure 8:
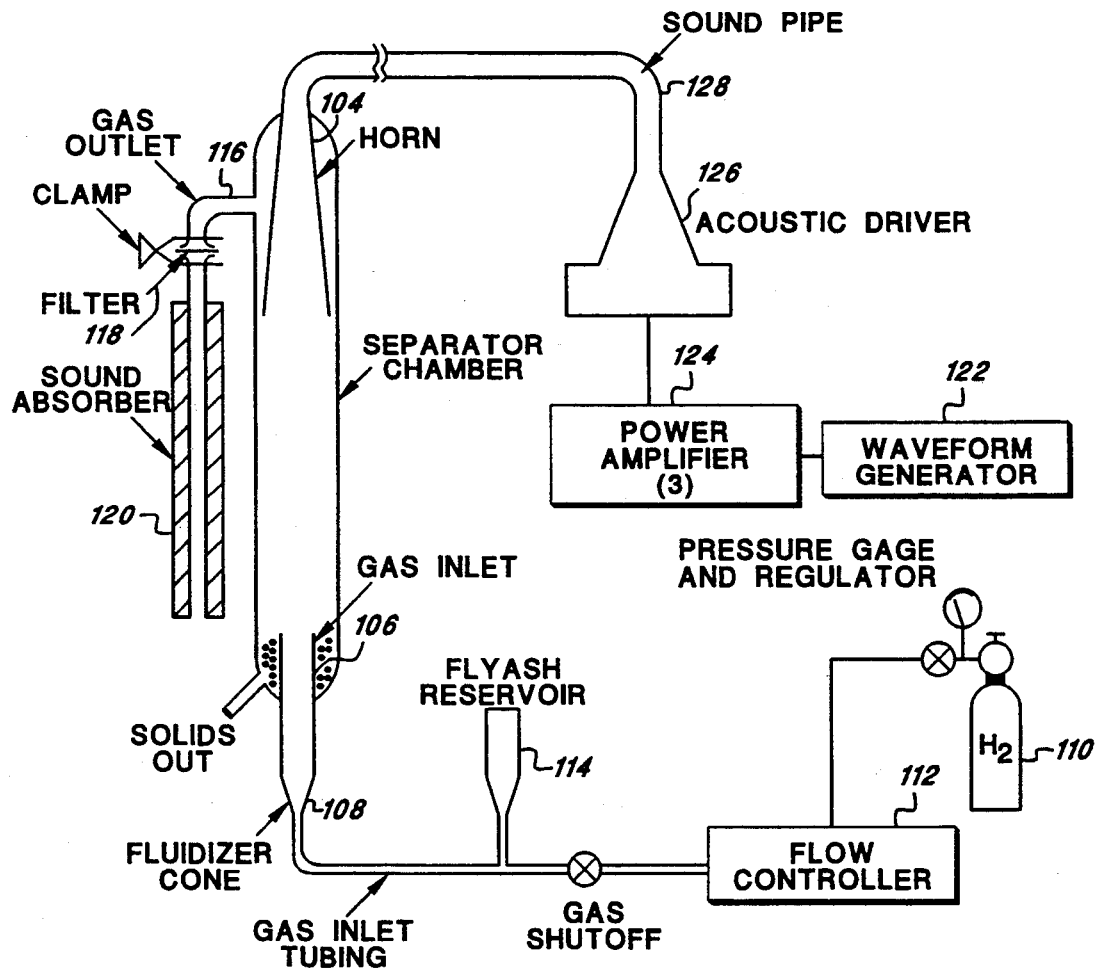
FIG. 8 schematically depicts a test configuration used to test the present invention.
Figure 8:
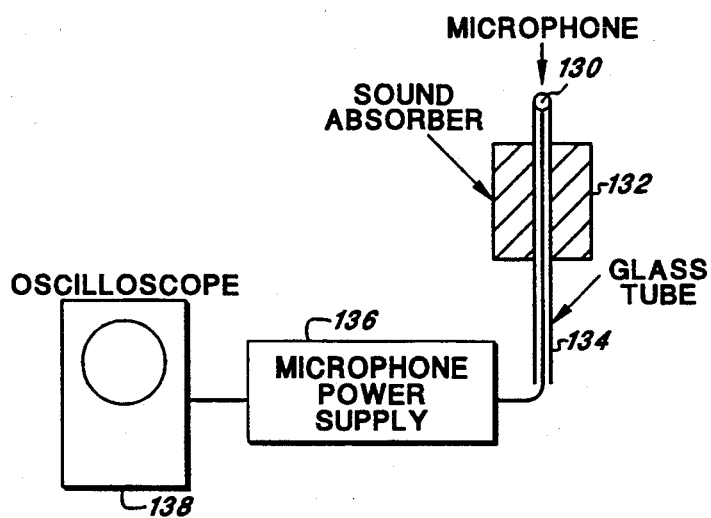

A test procedure was developed that utilized a test configuration as shown in FIG. 8. The test configuration included a separator chamber 102 having a linearly tapered horn 104 at one end and a gas inlet 106 at the other end. A fluidizer cone 108 was positioned intermediate the gas inlet 106 and a source of nitrogen 110. A flow controller 112 provided a means for controlling the gas flow through the gas inlet. An invertible fly ash reservoir 114 provided a means for introducing fly ash into the gas stream. A gas outlet 116 was located at the other end of the separator chamber 102 opposite the gas inlet. A filter 118 was positioned within the gas outlet to gather any particulates that might be included in the outlet gas stream. A sound absorber, or muffler, 120 was also inserted in the gas outlet, downstream from the filter 118. A waveform generator 122 produced an acoustic waveform that was amplified by a power amplifier 124. The resulting power amplified acoustic signal was delivered to the horn 104 via an acoustic driver 126 and a sound pipe 128. In order to characterize the acoustic signal, a microphone probe 130 was inserted into a small diameter glass tube 134, with a sound absorber 132 placed around the glass tube 134 near the probe end. The microphone probe was electrically connected to a suitable microphone power supply 136, which was connected to an oscilloscope 138.

The test procedure used with the configuration of FIG. 8 included the following steps:
1. Dry the Fly Ash
    a. Measure out 100 g fly ash into a 500 ml beaker.
    b. Heat at 90° C. for one hour.
    c. Remove an open bottle from a desiccator where it has been for more than 12 hours.
    d. Transfer the fly ash to the bottle.
    e. Cap and return to desiccator for storage.
2. Clean Separator Apparatus
    a. Remove gas inlet tubing so that gas inlet is open.
    b. Remove filter so that gas outlet is open.
    c. Apply 140 dB to 150 dB sound varying frequency 1.5 kHz to 3 kHz.
    d. Note dust motion to find resonant frequency.
    e. Remain at resonant frequency for 1 minute.
    f. Vary frequency for an additional 2 minutes.
3. Dry and Weigh Filter
    a. Use tweezers to remove one filter (GN-4 cellulose ester, 47 mm OD, 0.8 $\mu$m pore) from package.
    b. Heat the filter 1 min. in microwave oven at maximum power.
    c. Weigh on calibrated balance three times.
    d. Record measurements, balance location, serial no., and cal. date.
    e. Weigh a weighing paper to go below the filter during transport after experiment.
4. Install Filter
    a. Install immediately after weighing, handling with tweezers.
    b. Place an o-ring in lower glass face, add o-ring on top, raise to position, and clamp. Tighten screw on clamp.
    c. Add acoustic absorber pipe to outlet tube end.
5. Conduct Test
    a. With gas inlet tubing disconnected from separator, clear tubing of dust at max flow and then set flow rate, record flow rate.
    b. Close gas shutoff valve to stop flow.
    c. Transfer measured amount of fly ash to dust supply reservoir immediately after removal from desiccator, record fly ash weight.
    d. Connect particulate supply to gas tubing by tee.
    e. Connect gas tubing to gas inlet.
    f. Apply sound, record frequency, power setting and waveform.
    g. Open valve to establish gas flow.
    h. At a recorded time, start particulate flow by inverting reservoir.
    i. Maintain steady input stream of fly ash until reservoir is empty.
    j. Record time that reservoir empties.
    k. Continue run for 2 minutes after reservoir empties, then valve off gas, record time, and shut off sound.
6. Remove, Inspect, and Weigh Filter
    a. Remove sound absorber and clamp, then lower the glass tube with the filter away from the mating surface.
    b. Remove filter and place on pre-weighed paper in plastic box.
    c. Inspect the dust pattern to confirm seal integrity, record result.
    d. Weigh filter, paper, and retained dust immediately, record weight.
    e. Weight filter and retained dust three times.
    f. Allow filter to age in air for 2 minutes, weigh again, record weights and scale ID No., location, and cal. date.
    g. Weigh paper and dust spillover, record weight.
    h. Store filter in individual plastic box labeled with test number.
7. Repeat for Next Sound Power Level
    a. Repeat steps 3-7 for next value of sound power. Test runs proceed from: low power to high, then high to low, then low to high.
    b. Three measurements (one per run) are made at each power setting.
8. Calibrate Acoustic Power
    a. Remove the gas inlet section of the apparatus by hot wire cracking.
    b. Insert Bruel and Kjaer microphone in open glass tube through 5 inch length of form packing to mid section of separator chamber.
    c. Connect to oscilloscope and to type 2807 microphone power supply.
    d. Apply acoustic power and adjust axially to midway between max, min.
    e. Record peak voltage for each of 4 settings of acoustic power.
    f. Convert to acoustic intensity using microphone cal data, and record.
    g. Vary axial position, and measure/record standing wave ratio.
9. Data Analysis
    a. Summarize data in tabular form as percent mass retained, 3 measurements at each intensity.
    b. Calculate high, low and average values.

c. Plot average value of mass retained versus intensity.

d. Indicate confidence level by bar connecting high and low values.

Using the above procedure, several separation tests were performed. The acoustic measurements (acoustic power calibration) were performed prior to beginning the separator tests. Also, prior to the separation tests, the filter was dried by inserting it in a microwave oven for 1 minute, and its weight was noted with time exposure to room air on a rainy day. The filter weight was stable to within 0.2 mg over 20 minutes and did not trend upward. Each separation test required between 1 hour and 1.5 hour to complete, including filter preparation and final weighing and recording. During the separation test, it required about 10 minutes to empty the fly ash hopper which contained 1 gram of fly ash. Each filter with retained fly ash was weighed within 5 minutes after the gas flow (1.1 liters min) was stopped. The fly ash used complied with ASTM C 618, and was certified by the supplier. The nitrogen used was 99.98% pure and was also certified by the supplier. The flow controlled was capable of controlling the flow at 1000 scc/min±50 scc/min.

The test results are summarized in Table 1. An analysis of the percent mass retained is shown in Table 2. As the test data show, at a sound intensity of 617 W/m$^2$, the dust removal efficiency (DRE) ranged from 84.8% to 90.0%, with an average of 88.2%. At a sound intensity of 1000 W/m$^2$, the DRE ranged from 95.6% to 97.6%, with an average of 96.8%.

TABLE 1

| Sound | Particulate Weight on Filter (mg) | | | |
|---|---|---|---|---|
| Level | trial 1 | trial 2 | trial 3 | Average |
| No Sound | 73.3 | 67.4 | 79.1 | 73.2 |
| 617 W/m2 | 7.31 | 7.44 | 11.1 | 8.61 |
| 1000 W/m2 | 2.01 | 3.24 | 1.72 | 2.32 |

TABLE 2

| Sound | Percent Mass Retained | | | |
|---|---|---|---|---|
| Level | trial 1 | trial 2 | trial 3 | Average |
| 617 W/m2 | 10.0 | 10.2 | 15.2 | 11.8 |
| 1000 W/m2 | 2.7 | 4.4 | 2.3 | 3.2 |

While the invention has been described with reference to a preferred embodiment, it is to be clearly understood by those skilled in the art that the invention is not limited thereto. Accordingly, the scope of the invention is to be interpreted only in conjunction with the appended claims.

What is claimed is:

1. An apparatus for removing particulates from a gas flow, comprising:

a separator chamber;

an entrance flue means for delivering a gas flow containing particulates into said separator chamber;

an exit flue means for delivering the gas flow from said separator chamber;

acoustic waveform generating means for injecting an acoustic waveform into the separator chamber against the gas flow, imparting an oscillating gas velocity to the gas flow, and imparting a substantial Oseen force on said particulates that forces said particulates from the gas flow; and collection means for collecting particulates forced from the gas flow in said separator chamber by the Oseen force.

2. An apparatus according to claim 1, wherein said acoustic waveform generating means comprises means for generating the acoustic waveform so that it has a fundamental frequency and a second harmonic that is phase shifted about $-\pi/2$ radians with respect to said fundamental frequency.

3. An apparatus according to claim 2, wherein said acoustic waveform generating means includes means for generating the acoustic waveform so that approximately the same amount of power is included in the second harmonic as is included in the fundamental frequency.

4. An apparatus according to claim 2, wherein said acoustic waveform generating means includes means for selecting the frequency of the fundamental frequency to be within the range of audible frequencies.

5. An apparatus according to claim 4, wherein said acoustic waveform generating means generates the fundamental frequency to be within the frequency range from 500 Hz to 8,000 Hz.

6. An apparatus according to claim 1, further comprising a sorbent injection system that includes means for injecting chemically absorbent particulates into said gas flow in said entrance flue for combining with volatile gaseous species contained in said gas flow.

7. An apparatus according to claim 6, wherein said sorbent injection system injects chemically absorbent particulates that combine with sulfur oxide species.

8. An apparatus according to claim 6, wherein said acoustic waveform generated by the acoustic waveform generating means comprises a fundamental frequency, f, and a second harmonic, and wherein an entrainment parameter, which comprises the ratio of (1) the viscosity of the gas flow, $\eta$, multiplied by nine, to (2) the product of the density of the gas flow, $\rho$, the square of the average radius, r, of said chemically absorbent particulates, and the fundamental frequency, f, multiplied by $4\pi$ times the square root of two, is less than about 0.4.

9. An apparatus according to claim 8, wherein said sorbent injection system includes means for injecting chemically absorbent particulates having a diameter of about 2 microns in diameter, and wherein said acoustic waveform generating means generates said acoustic waveform to have a fundamental frequency of about 8,000 Hz.

10. An apparatus according to claim 2, further comprising catalytic converter means in said exit flue for reducing nitrogen oxides in said gas flow, and ammonia injection means for injecting a suitable amount of ammonia for catalytic conversion into said gas flow in said entrance flue.

11. An apparatus according to claim 2, wherein said acoustic waveform is directed against the direction of the gas flow.

12. An apparatus according to claim 2, wherein said acoustic waveform is directed laterally to the direction of the gas flow.

13. An apparatus according to claim 2, further comprising:

valve means for discharging solids comprising collected particulates from said collection hopper to maintain a selected level of solids in said collection hopper;

bin means for receiving discharged solids via said valve; and means for providing a sufficient positive air pressure in said bin to prevent infiltration into said bin via said valve by gas from the gas flow.

14. An apparatus according to claim 13, further comprising:
a horizontal conduit between said valve and said bin; and
conveyor screw means for conveying along said horizontal conduit to said bin solids discharged by said valve.

* * * * *